(12) United States Patent
Harada et al.

(10) Patent No.: US 10,760,680 B2
(45) Date of Patent: Sep. 1, 2020

(54) HYDRAULIC CONTROL DEVICE

(71) Applicant: HONDA MOTOR CO., LTD., Minato-ku, Tokyo (JP)

(72) Inventors: Masamichi Harada, Wako (JP); Makito Nakasone, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 25 days.

(21) Appl. No.: 16/055,185

(22) Filed: Aug. 6, 2018

(65) Prior Publication Data
US 2019/0048996 A1    Feb. 14, 2019

(30) Foreign Application Priority Data

Aug. 10, 2017  (JP) ................................. 2017-155244

(51) Int. Cl.
| | | |
|---|---|---|
| F16H 61/00 | (2006.01) | |
| F16H 61/662 | (2006.01) | |
| F16H 61/664 | (2006.01) | |
| F16H 61/02 | (2006.01) | |
| F16H 61/14 | (2006.01) | |
| F16H 57/04 | (2010.01) | |

(52) U.S. Cl.
CPC ..... *F16H 61/0025* (2013.01); *F16H 61/0009* (2013.01); *F16H 61/0031* (2013.01); *F16H 61/0213* (2013.01); *F16H 61/662* (2013.01); *F16H 61/6646* (2013.01); *F16H 61/66259* (2013.01); *F16H 57/0436* (2013.01); *F16H 61/143* (2013.01); *F16H 2061/0209* (2013.01)

(58) Field of Classification Search
CPC ............. F16H 61/0025; F16H 61/0031; F16H 61/662; F16H 61/66259; F16H 61/6646; F16H 61/0009; F16H 61/0213; F16H 2061/0209; F16H 61/143; F16H 57/0436; F16H 61/66; F16H 61/61; F15B 11/18; F15B 13/06; F15B 19/00; F15B 21/087
See application file for complete search history.

(56) References Cited

U.S. PATENT DOCUMENTS

| | | | | |
|---|---|---|---|---|
| 6,390,947 B1 * | 5/2002 | Aoki | .................... | B60W 10/06 477/156 |
| 2012/0290158 A1* | 11/2012 | Yoshikawa | .............. | B60K 6/48 701/22 |
| 2013/0171008 A1* | 7/2013 | Uda | ........................ | F04B 49/06 417/44.2 |

(Continued)

FOREIGN PATENT DOCUMENTS

| | | |
|---|---|---|
| JP | 2015-200369 | 11/2015 |
| JP | 2015-230079 | 12/2015 |

*Primary Examiner* — David J Hlavka
(74) *Attorney, Agent, or Firm* — Amin, Turocy & Watson, LLP

(57) ABSTRACT

In a hydraulic control device, a state determination unit of a control unit determines whether a second pump is in a boosting operation or in a transition state. If the state determination unit has determined that the second pump is in the boosting operation or in the transition state, a valve-opening detection unit determines whether a check valve is opened. If the valve-opening detection unit has determined that the check valve is opened, a controller stops the second pump or decreases the rotation number of the second pump.

6 Claims, 6 Drawing Sheets

(56) References Cited

U.S. PATENT DOCUMENTS

| | | | |
|---|---|---|---|
| 2015/0046005 A1* | 2/2015 | Kasuya | F16H 61/0031 701/22 |
| 2015/0316144 A1* | 11/2015 | Yoshitani | F16H 61/0021 475/31 |
| 2016/0305455 A1* | 10/2016 | Quan | E02F 9/128 |
| 2019/0211920 A1* | 7/2019 | Kidachi | F16H 61/0031 |

* cited by examiner

HYDRAULIC CONTROL DEVICE

CROSS-REFERENCE TO RELATED APPLICATION

This application is based upon and claims the benefit of priority from Japanese Patent Application No. 2017-155244 filed on Aug. 10, 2017, the contents of which are incorporated herein by reference.

BACKGROUND OF THE INVENTION

Field of the Invention

The present invention relates to a hydraulic control device that has, between a first pump and a hydraulic operation unit, a second pump and a check valve connected in parallel, and that supplies first oil from the first pump to the hydraulic operation unit through the check valve, or pressurizes the first oil with the second pump and supplies the first oil that has been pressurized to the hydraulic operation unit as second oil.

Description of the Related Art

For example, Japanese Laid-Open Patent Publication No. 2015-200369 discloses a hydraulic control device in a transmission of a vehicle that has, between a first pump and a hydraulic operation unit of the transmission, a second pump and a check valve connected in parallel. In this case, when an engine is started, firstly, first oil is supplied from the first pump to the hydraulic operation unit through the check valve. After that, the second pump is driven to pressurize the first oil that is supplied from the first pump with the second pump and supplies the first oil that is pressurized to the hydraulic operation unit as second oil.

SUMMARY OF THE INVENTION

Incidentally, when the check valve is opened by a disturbance that exceeds the discharging capability of the second pump while the second pump is driven, the pressure value of the oil supplied to the hydraulic operation unit (pressure value of second oil) becomes approximately equal to the discharging pressure of the first pump (pressure value of first oil). If the driving of the second pump is continued in this state, hunting, that is, opening and closing of the check valve occur and the pressure values of the first oil and the second oil pulsate.

Moreover, if the check valve is opened due to the pressure difference between the first oil and the second oil in a transition state for stopping the second pump that is driven or shifting the second pump that is driven to a low-rotation state (idling state), the hunting of the check valve occurs and the pressure values of the first oil and the second oil pulsate.

As described above, if the oil with the pulsating pressure value is supplied to the hydraulic operation unit, an operation state of the hydraulic operation unit may be influenced.

The present invention is an improvement of the hydraulic control device according to Japanese Laid-Open Patent Publication No. 2015-200369, and an object is to provide a hydraulic control device that can prevent the hunting of the check valve.

The present invention relates to a hydraulic control device including, between a first pump and a hydraulic operation unit of a transmission, a second pump and a check valve connected in parallel and being configured to supply first oil from the first pump to the hydraulic operation unit through the check valve, or pressurize the first oil that is supplied from the first pump with the second pump and supply the first oil that has been pressurized to the hydraulic operation unit as second oil.

In order to achieve the object, the hydraulic control device includes a valve-opening detection unit configured to detect that the check valve is opened while the second pump is driven, and a pump controller configured to stop the second pump or decrease a rotation speed of the second pump on a basis of a detection result of the valve-opening detection unit.

Thus, when it is detected that the check valve is opened, the second pump is immediately stopped or shifted to a low-rotation state. As a result, in the middle of boosting of the second pump or in a transition state of the second pump from a driving state to the stop state or the low-rotation state, the hunting of the check valve can be prevented.

Here, the valve-opening detection unit may be configured to detect that the check valve is opened on a basis of a change in torque of the second pump. In addition, the valve-opening detection unit may be configured to detect that the check valve is opened on a basis of a change in rotation speed of the second pump. In either case, it is possible to efficiently detect that the check valve is opened.

The valve-opening detection unit may be configured to determine that the check valve is opened when the rotation speed increases and the torque decreases and/or when the torque becomes lower than a predetermined threshold. In this manner, by detecting an improbable operation of the second pump, it is possible to easily and quickly determine that the check valve is opened.

The hydraulic control device may further include a hydraulic sensor configured to detect a pressure value of the first oil that is supplied from the first pump to the second pump, and the valve-opening detection unit may be configured to detect that the check valve is opened on a basis of a change in pressure value of the first oil detected by the hydraulic sensor. In this case, it is also possible to efficiently detect that the check valve is opened.

In addition, the valve-opening detection unit may be configured to determine that the check valve is opened when the pressure value of the first oil is approximately the same as an estimation value of a pressure value of oil that is supplied to the hydraulic operation unit or the pressure value of the oil that is detected by another hydraulic sensor. In this case as well, by detecting the improbable operation of the second pump, it is possible to easily and quickly determine that the check valve is opened.

The second pump is an electric pump that is driven by a motor, and the pump controller is configured to stop the second pump or decrease the rotation speed of the second pump by controlling the motor on the basis of the detection result of the valve-opening detection unit. Thus, the second pump can be controlled efficiently through the motor.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a hydraulic control device according to the present invention will hereinafter be described in detail with reference to the attached drawings.

1. Structure of the Present Embodiment

Figure 1:
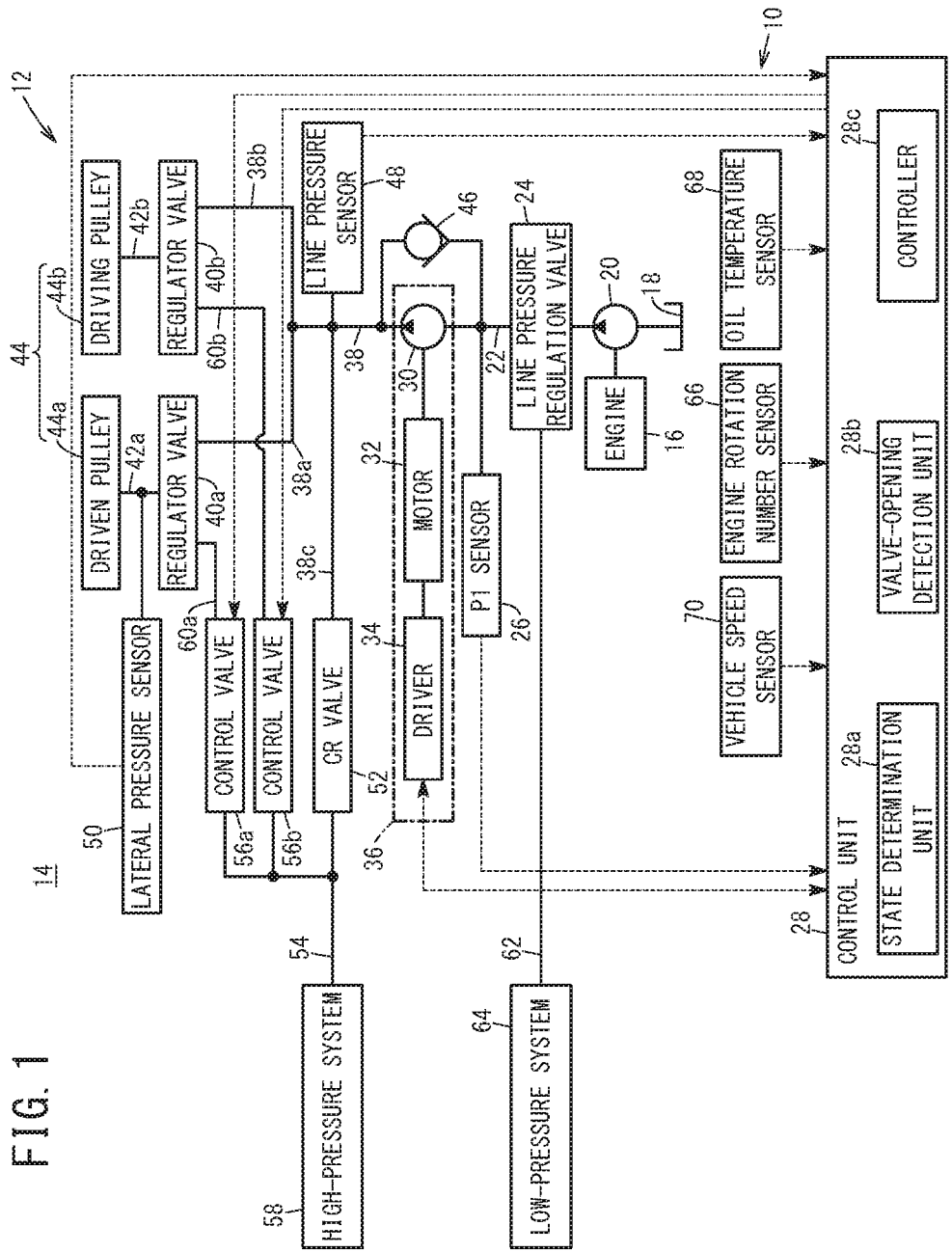
FIG. 1 is a structure diagram of a hydraulic control device according to the present embodiment.

FIG. 1 is a structure diagram of a hydraulic control device 10 according to the present embodiment. The hydraulic control device 10 is used in, for example, a vehicle 14 including a transmission 12 corresponding to a continuously variable transmission (CVT).

The hydraulic control device 10 includes a first pump (mechanical pump) 20 that is driven by an engine 16 of the vehicle 14 and pumps up oil (hydraulic oil) stored in a reservoir 18 and transfers the oil with pressure. An output side of the first pump 20 is connected to an oil passage 22. The oil that is transferred with pressure from the first pump 20 flows as first oil in the oil passage 22. In the middle of the oil passage 22, a line pressure regulation valve 24 corresponding to a spool valve is provided.

In the oil passage 22, an output pressure sensor (P1 sensor) 26 is disposed on a downstream side relative to the line pressure regulation valve 24. The output pressure sensor 26 is a hydraulic sensor that sequentially detects a pressure (pressure value) P1 of the first oil (output pressure of the first pump 20) flowing in the oil passage 22, and sequentially outputs a detection signal expressing the detected output pressure P1 to a control unit 28 to be described below. On the downstream side in the oil passage 22, a second pump 30 that is smaller in capacity than the first pump 20 is connected.

The second pump 30 is an electric pump that is driven by a rotation of a motor 32 included in the vehicle 14, and that outputs as second oil, the first oil that is supplied through the oil passage 22. In this case, the second pump 30 can pressurize the first oil that is supplied, and transfer the first oil that has been pressurized as the second oil. The motor 32 rotates under a control of a driver 34. The driver 34 controls the driving of the motor 32 on the basis of a control signal supplied from the control unit 28, and moreover, sequentially outputs a signal expressing a driving state of the motor 32 (for example, a rotation number (rotation speed) Nem of the motor 32 in accordance with a rotation number (rotation speed) Nep of the second pump 30) to the control unit 28. The second pump 30, the motor 32, and the driver 34 form an electric pump unit 36.

An output side of the second pump 30 is connected to an oil passage 38. The oil passage 38 is branched into two oil passages 38a, 38b on the downstream side. One oil passage 38a is connected through a regulator valve 40a and an oil passage 42a to a driven pulley 44a included in a continuously variable transmission mechanism 44 of the transmission 12. The other oil passage 38b is connected through a regulator valve 40b and an oil passage 42b to a driving pulley 44b included in the continuously variable transmission mechanism 44.

Between the two oil passages 22, 38, a check valve 46 and the second pump 30 are connected in parallel. The check valve 46 is a non-return valve provided to bypass the second pump 30, and allows the oil (first oil) to flow from the oil passage 22 disposed upstream to the oil passage 38 disposed downstream, and prevents the oil (second oil) from flowing from the oil passage 38 disposed downstream to the oil passage 22 disposed upstream.

A line pressure sensor 48 is disposed in the oil passage 38. The line pressure sensor 48 is a hydraulic sensor that sequentially detects a pressure (pressure value, line pressure) PH of the oil flowing in the oil passage 38, and sequentially outputs the detection signal expressing the detected line pressure PH to the control unit 28. Note that in the present embodiment, the line pressure sensor 48 is not an essential component. That is to say, it is only necessary that at least the output pressure sensor 26 is disposed in the present embodiment. In the oil passage 42a, a lateral pressure sensor 50 is disposed as a hydraulic sensor that detects a pressure PDN of the oil to be supplied to the driven pulley 44a (pulley pressure corresponding to the lateral pressure of the driven pulley 44a).

A CR valve 52 is connected to the downstream side of an oil passage 38c that is branched from the oil passage 38. The upstream side of the CR valve 52 is connected to the oil passage 38c, and the downstream side of the CR valve 52 is connected to two control valves 56a, 56b and a high-pressure system 58 of the transmission 12 through an oil passage 54. The CR valve 52 is a reducing valve. The CR valve 52 reduces the pressure of the oil (second oil) supplied from the oil passage 38c, and supplies the oil with the reduced pressure to the control valves 56a, 56b and the high-pressure system 58 through the oil passage 54.

The high-pressure system 58 is, for example, a forward clutch (not shown) included in the transmission 12, and the oil to be supplied to the high-pressure system 58 is higher in pressure than a low-pressure system 64 to be described below. Note that in the transmission 12, the oil with the highest pressure is supplied to the driven pulley 44a.

Each of the control valves 56a, 56b is a normally open electromagnetic valve with a solenoid. The control valves 56a, 56b are closed while the control signal (current signal) is supplied from the control unit 28 and current flows in the solenoid, and on the other hand, the control valves 56a, 56b are open while current does not flow in the solenoid.

One control valve 56a is a solenoid valve for the driven pulley 44a, and when the valve is opened, the oil supplied from the CR valve 52 through the oil passage 54 is supplied to the regulator valve 40a through an oil passage 60a. The other control valve 56b is a solenoid valve for the driving pulley 44b, and when the valve is opened, the oil supplied from the CR valve 52 through the oil passage 54 is supplied to the regulator valve 40b through an oil passage 60b.

Therefore, one regulator valve 40a uses the pressure of the oil supplied from the control valve 56a through the oil passage 60a, as a pilot pressure. If the line pressure PH of the oil supplied through the oil passages 38, 38a is more than or equal to a predetermined pressure, the regulator valve 40a is opened to supply the oil to the driven pulley 44a through the oil passage 42a. In addition, the other regulator valve 40b uses the pressure of the oil supplied from the control valve 56b through the oil passage 60b, as the pilot pressure.

If the line pressure PH of the oil supplied through the oil passages 38, 38b is more than or equal to the predetermined pressure, the regulator valve 40b is opened to supply the oil to the driving pulley 44b through the oil passage 42b. The control valves 56a, 56b can regulate the pressure of the oil output to the oil passages 60a, 60b, respectively.

To an oil passage 62 branched from the oil passage 22 through the line pressure regulation valve 24, the low-pressure system 64 of the transmission 12 is connected. To the low-pressure system 64, the first oil is supplied through the oil passage 62. The line pressure regulation valve 24 is a spool valve. The line pressure regulation valve 24 regularly connects between the first pump 20, and the second pump 30 and the check valve 46 through the oil passage 22, and by a displacement of the spool that is not shown, connects between the oil passage 22 and the oil passage 62 so that the first oil flows to the oil passage 62. The low-pressure system 64 is, for example, a torque converter and a lubricant system.

Note that in the line pressure regulation valve 24, the pressure of the first oil flowing in the oil passage 62 may be lower than the output pressure PH of the first oil flowing in the second pump 30 and the check valve 46 through the oil passage 22. Therefore, in the description below, the first oil flowing in the oil passage 62 may be referred to as third oil and the pressure of the third oil may be referred to as a pressure P3.

The hydraulic control device 10 further includes an engine rotation number sensor 66, an oil temperature sensor 68, a vehicle speed sensor 70, and the control unit 28. The engine rotation number sensor 66 sequentially detects the engine rotation number (engine rotation speed) New of the engine 16 in accordance with the rotation number (rotation speed) Nmp of the first pump 20, and sequentially outputs the detection signal expressing the detected engine rotation number New (rotation number Nmp) to the control unit 28. The oil temperature sensor 68 sequentially detects a temperature (oil temperature) To of the first oil or the second oil, and sequentially outputs the detection signal expressing the detected oil temperature To to the control unit 28. The vehicle speed sensor 70 sequentially detects a vehicle speed V of the vehicle 14, and sequentially outputs the detection signal expressing the detected vehicle speed V to the control unit 28.

The control unit 28 is a microcomputer such as a CPU functioning as a transmission control unit (TCU) that controls the transmission 12 or an engine control unit (ECU) that controls the engine 16. The control unit 28 achieves functions of a state determination unit 28a, a valve-opening detection unit 28b, and a controller (pump controller) 28c by reading and executing programs stored in a storage unit that is not shown.

The state determination unit 28a determines the current operation state of the second pump 30 on the basis of the detection results from the above sensors. If the state determination unit 28a has determined that the second pump 30 is currently driven, the valve-opening detection unit 28b determines whether the check valve 46 is opened on the basis of the detection results from the above sensors. That is to say, the valve-opening detection unit 28b detects that the check valve 46 is opened while the second pump 30 is driven. Note that a procedure of determining whether the check valve 46 is opened or closed by the valve-opening detection unit 28b will be described below.

The controller 28c generates the control signal for controlling the motor 32 on the basis of the detection result of the valve-opening detection unit 28b, and outputs the control signal to the driver 34. In this case, if the detection result indicates that the check valve 46 is opened, the controller 28c generates the control signal for stopping the second pump 30 or decreasing the rotation number Nep of the second pump 30 (shifting the second pump 30 to a low-rotation state (idling state)). On the other hand, if the detection result indicates that the check valve 46 is closed, the controller 28c generates the control signal for continuing the driving of the second pump 30.

Note that since the transmission 12 corresponding to the continuously variable transmission is well known, the detailed description thereof is omitted.

2. Operation of the Present Embodiment

An operation of the hydraulic control device 10 according to the present embodiment with the above structure will be described with reference to FIG. 2 to FIG. 6. Here, description is mainly made of a case in which the opening/closing of the check valve 46 while the second pump 30 is driven is detected so that the second pump 30 is optimally controlled to drive. The description is also made with reference to FIG. 1 as necessary.

<2. 1 Basic Operation of Hydraulic Control Device 10>

Before the operation is described, a basic operation of the hydraulic control device 10 is described. The basic operation to be described mainly here is the operation of a hydraulic system that supplies the oil to the continuously variable transmission mechanism 44 from the reservoir 18 through the first pump 20, for example.

First, when the driving of the first pump 20 is started by the driving of the engine 16, the first pump 20 pumps up the oil from the reservoir 18 and starts to transfer the pumped oil as the first oil with pressure. Thus, the first oil flows in the oil passage 22 through the line pressure regulation valve 24. The output pressure sensor 26 sequentially detects the pressure (output pressure) P1 of the first oil flowing in the oil passage 22, and outputs the signal expressing the detection result to the control unit 28. The engine rotation number sensor 66 sequentially detects the engine rotation number New, and sequentially outputs the signal expressing the detection result to the control unit 28.

In this case, the motor 32 is not driven; therefore, the first oil flowing in the oil passage 22 flows to the oil passage 38 through the check valve 46. Thus, the first oil is supplied to the CR valve 52 through the oil passages 38, 38c. The CR valve 52 reduces the pressure of the first oil that is supplied, and supplies the first oil with the reduced pressure to the control valves 56a, 56b through the oil passage 54. In addition, the line pressure sensor 48 sequentially detects the pressure of the first oil (line pressure PH) flowing in the oil passage 38, and sequentially outputs the signal expressing the detection result to the control unit 28.

Here, the control signal is supplied in advance from the control unit 28 to the solenoid in each of the control valves 56a, 56b, so that the control valves 56a, 56b are in a closed state. Then, if the supply of the control signal to each solenoid is stopped, the control valves 56a, 56b are switched from the closed state to an open state. Thus, the control valves 56a, 56b supply the oil to the regulator valves 40a, 40b through the oil passages 60a, 60b, respectively.

The regulator valve 40a uses the pressure of the oil supplied through the oil passage 60a, as the pilot pressure, and if the pressure of the first oil is more than or equal to the predetermined pressure, the regulator valve 40a is opened to supply the first oil to the driven pulley 44a through the oil passage 42a. The lateral pressure sensor 50 sequentially detects the pressure of the first oil supplied to the driven pulley 44a (pulley pressure PDN as the lateral pressure), and sequentially outputs the signal expressing the detection result to the control unit 28.

On the other hand, the regulator valve 40b uses the pressure of the oil supplied through the oil passage 60b, as the pilot pressure, and if the pressure of the first oil (line pressure PH) is more than or equal to the predetermined pressure, the regulator valve 40b is opened to supply the first oil to the driving pulley 44b through the oil passage 42b.

Note that when the spool valve is displaced depending on the line pressure PH, the line pressure regulation valve 24 enables the oil passage 22 and the oil passage 62 to communicate with each other and supply the first oil as the third oil to the low-pressure system 64.

In this manner, when the control signal is supplied from the control unit 28 (the controller 28c thereof) to the driver 34 in a state that the first pump 20 is driven, the driver 34 drives the motor 32 on the basis of the control signal to drive the second pump 30. Thus, the second pump 30 outputs as the second oil, the first oil that flows in the oil passage 22. The second oil is supplied to the CR valve 52 through the oil passages 38, 38c.

Then, the second oil flows in the oil passage 38 and if the flow rate of the second oil (discharging flow rate of the second pump 30) has exceeded the flow rate of the first oil (discharging flow rate of the first pump 20), the pressure of the oil (line pressure PH) on the oil passage 38 side becomes higher than the pressure of the oil (output pressure P1) on the oil passage 22 side in the check valve 46. Thus, the check valve 46 is closed, so that the supply of the first oil from the first pump 20 to the continuously variable transmission mechanism 44 or the like through the check valve 46 and the oil passage 38 is switched to the supply of the second oil from the second pump 30 to the continuously variable transmission mechanism 44 or the like through the oil passage 38. As a result, the flow of the first oil to the oil passage 38 is stopped and the second pump 30 transfers the second oil with pressure to the continuously variable transmission mechanism 44 or the like. Note that the driver 34 sequentially outputs the signal expressing the motor rotation number Nem of the motor 32 (the rotation number Nep of the second pump 30) to the control unit 28.

The CR valve 52 reduces the pressure of the second oil that is supplied, and supplies the second oil with the reduced pressure to the control valves 56a, 56b through the oil passage 54. Since the control valves 56a, 56b are in the open state, the oil is supplied to the regulator valves 40a, 40b through the oil passages 60a, 60b.

As a result, the regulator valve 40a supplies the second oil to the driven pulley 44a using as the pilot pressure, the pressure of the oil supplied through the oil passage 60a. The lateral pressure sensor 50 sequentially detects the pressure of the second oil supplied to the driven pulley 44a (pulley pressure PDN), and outputs the detected pressure to the control unit 28. On the other hand, the regulator valve 40b supplies the second oil to the driving pulley 44b using as the pilot pressure, the pressure of the oil supplied through the oil passage 60b.

Thus, since the second oil that has been pressurized (PH>P1) is supplied to the driven pulley 44a and the driving pulley 44b, the pressure (output pressure) P1 of the first oil can be reduced and accordingly, the load on the first pump 20 can be reduced.

Figure 2:
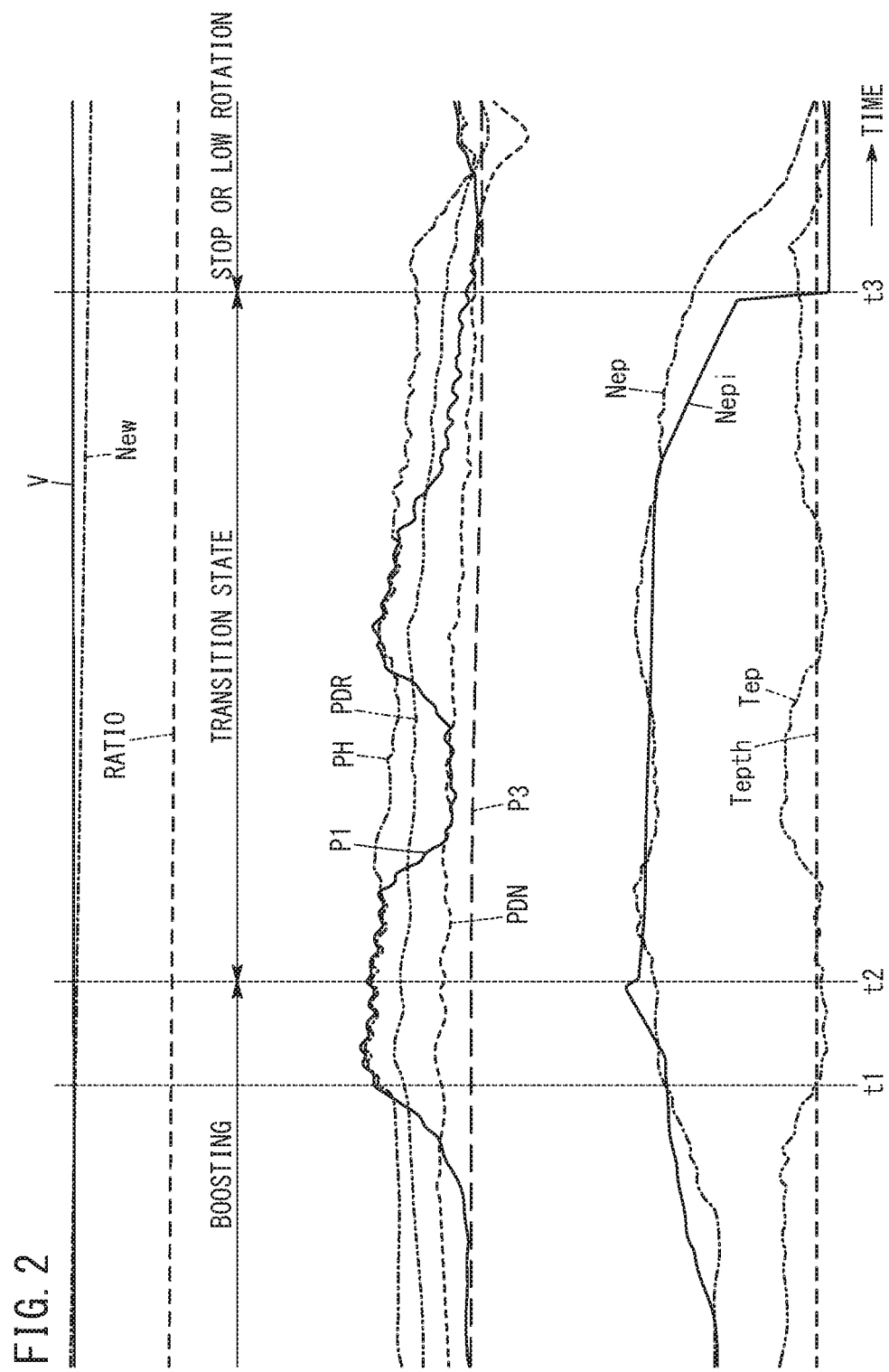
FIG. 2 is a timing chart expressing a change of a hydraulic state.

<2. 2 Description of FIG. 2>

FIG. 2 is a timing chart expressing along elapsed time, various pieces of data regarding the vehicle 14 including the transmission 12 illustrated in FIG. 1, such as the vehicle speed V. Here, a problem while the second pump 30 is driven will be described.

In FIG. 2, while the second pump 30 is driven, in a time band before a time point t1, a command value Nepi of the rotation number Nep of the second pump 30 increases as time elapses and the actual rotation number Nep increases following the command value Nepi. On the other hand, as time elapses, a torque Tep of the second pump 30 decreases and reaches a predetermined threshold Tepth at the time point t1. That is to say, although the control unit 28 instructs the driver 34 to increase the rotation number Nep on the basis of the command value Nepi, the torque Tep decreases. Thus, it can be determined that the increase of the rotation number Nep is not resulted from the driving force of the motor 32 but from the reception of a fluid force of the first oil discharged from the first pump 20.

Note that since the states of the motor 32 and the second pump 30 (for example, the rotation number Nem, Nep) are sequentially notified from the driver 34 to the control unit 28, the torque Tep can be calculated in the control unit 28 on the basis of the rotation number Nep. The threshold Tepth is a threshold of a substantial idling torque of the second pump 30, and if the torque Tep is lower than this value, it can be regarded that the second pump 30 idles, that is, the first oil is not pressurized. In addition, in the control unit 28, for example, a request output of the second pump 30 is obtained on the basis of the accelerator opening of the vehicle 14 or the detection results of the sensors input to the control unit 28. In accordance with the obtained request output, an operation point of the second pump 30 is specified and on the basis of the specified operation point, the command value Nepi of the rotation number Nep of the second pump 30 is calculated.

On the other hand, the output pressure P1 is approximately the same as the pressure P3 of the third oil at first, and increases as time elapses and becomes approximately the same as the line pressure PH at the time point t1. That is to say, by driving the second pump 30, the output pressure P1 is reduced to attempt to reduce the load on the first pump 20; however, the output pressure P1 increases up to the line pressure PH. It is considered that this is because the check valve 46 is opened by a disturbance that exceeds the discharging capability of the second pump 30 and the pressure value (line pressure PH) of the oil supplied to the continuously variable transmission mechanism 44 becomes equal to the output pressure P1 corresponding to the discharging pressure of the first pump 20. If the check valve 46 is opened, the pressure of the oil on the upstream side increases due to the pressure loss, and thus the relation P1>PH holds.

Note that the pressure P3 of the third oil is estimated with reference to a map (not shown) in the control unit 28 from the transmission capacity requested by a lock-up clutch (not shown) in the vehicle 14. The line pressure PH may be estimated based on the detection results of the sensors described above (for example, oil temperature To, pulley pressure PDN, and current value of control signal supplied to control valves 56a, 56b), or may be the oil pressure value detected by the line pressure sensor 48. In the description below, the oil pressure value of the line pressure PH that is estimated is referred to as an estimation value PHe. In addition, FIG. 2 also shows how the pulley pressure PDR of the driving pulley 44b and a ratio (transmission ratio) between the driven pulley 44a and the driving pulley 44b change as time elapses.

When the torque Tep becomes lower than the threshold Tepth at the time point t1, pulsation may occur in the line pressure PH and the output pressure P1 of the oil pressure value that are approximately the same. It is considered that this pulsation is resulted from the following cause: when the second pump 30 is continuously driven with the check valve 46 open as described above, the hunting, that is, repeated opening and closing of the check valve 46 occur and the pressure values of the first oil and the second oil (output pressure P1, line pressure PH) change as time elapses.

If the oil with such a pulsation is supplied to the continuously variable transmission mechanism 44, there may be an influence on the operation state of the driven pulley 44a and the driving pulley 44b included in the continuously variable transmission mechanism 44. Specifically, the pulley pressures PDN, PDR decrease due to the pulsation, and the transmission function of the continuously variable transmission mechanism 44 may deteriorate or it may be difficult to maintain the transmission function.

In view of this, at a time point t2, it is established that the check valve 46 is opened. Then, instead of supplying the second oil from the second pump 30 to the continuously variable transmission mechanism 44, the second pump 30 is shifted from the driving state to the stop state or the low-rotation state (idling state).

In this case, a time band from the time point t2 to the time point t3 is a shift period (transition state) from the driving state to the stop state or to the low-rotation state. Therefore, at the time point t3, the shift to the stop state or the low-rotation state is completed and the first oil is supplied from the first pump 20 to the continuously variable transmission mechanism 44 through the check valve 46.

However, if the command value Nepi is gradually decreased as the time elapses in this transition state, the torque Tep increases or decreases around the threshold Tepth and the pulsation still occurs in the output pressure P1 and the line pressure PH. Thus, the output pressure P1 increases or decreases with respect to the line pressure PH. That is to say, in a conventional method, the control is performed so that the command value Nepi is gradually decreased from the time point t2 to the time point t3. Thus, in the transition state, the check valve 46 is opened due to the difference in oil pressure between the output pressure P1 and the line pressure PH and the hunting occurs in the check valve 46, and the pulsation occurs in the output pressure P1 and the line pressure PH.

Therefore, if it is detected that the check valve 46 is opened while the second pump 30 is driven, it is desirable that the rotation number Nep of the second pump 30 is decreased as soon as possible so as to prevent the hunting and reduce the pulsation; thus, the influence on the continuously variable transmission mechanism 44 can be avoided.

<2. 3 Overview of Hydraulic Control in the Present Embodiment>

Figure 3:
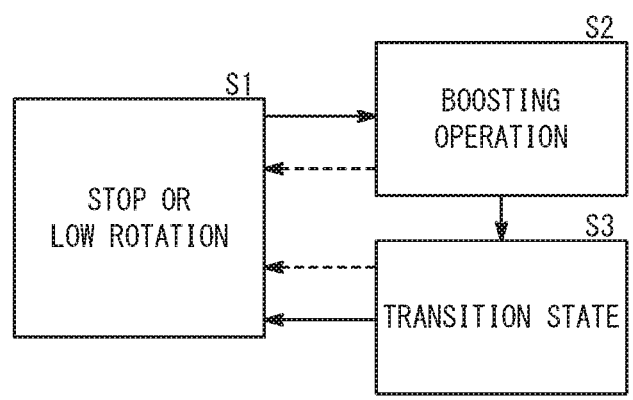
FIG. 3 is a state transition diagram schematically expressing an operation of the hydraulic control device illustrated in FIG. 1.
Figure 4:
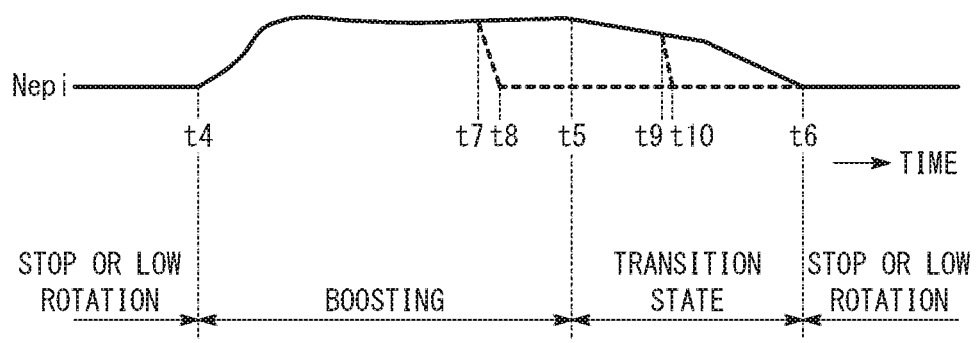
FIG. 4 is a timing chart expressing a hydraulic control in accordance with the state transition diagram in FIG. 3.
Figure 5:
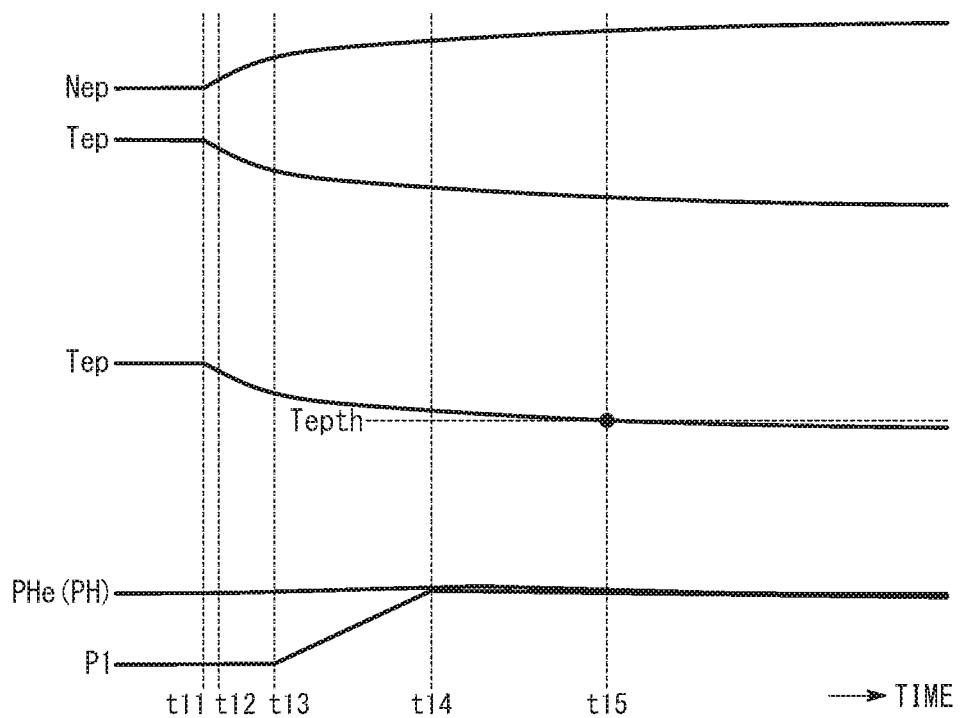
FIG. 5 is a timing chart expressing a relation between a rotation number of a second pump and torque, and a relation between an output pressure and a line pressure.

In order to solve the above problem, in the hydraulic control device 10 according to the present embodiment, the hunting of the check valve 46 is prevented by a principle illustrated in FIG. 3 to FIG. 5.

FIG. 3 is a state transition diagram regarding a control for the second pump 30 in the hydraulic control device 10. Here, each arrow of a solid line among steps S1 to S3 indicates the process of the control method in FIG. 2 described above, and each arrow of a dashed line indicates a process of a control method in the present embodiment.

Conventionally, if, after the state has shifted from the stop state or the low-rotation state in step S1 to the boosting operation in step S2 (driving state of the second pump 30 to time point t2 in FIG. 2), it is established that the check valve 46 is opened or it is determined that the check valve 46 will be opened by the change in the request output to the second pump 30, the state shifts to the transition state in step S3 once, and then the state returns to the stop state or the low-rotation state in step S1. That is to say, in the timing chart of the command value Nepi in FIG. 4, conventionally, the state shifts to the boosting operation in step S2 at a time point t4, shifts from the boosting operation to the transition state in step S3 at a time point t5, and shifts from the transition state to the stop state or the low-rotation state in step S1 at a time point t6. Therefore, in the time band in the boosting operation or the transition state, it is possible to detect that the check valve 46 is opened but the second pump 30 cannot be set to the stop state or the low-rotation state before the time point t6.

On the other hand, in the present embodiment, if it is detected that the check valve 46 is opened at a time point t7 after the state shifts from the stop state or the low-rotation state in step S1 to the boosting operation in step S2 at the time point t4, the state is immediately returned to the stop state or the low-rotation state in step S1. In this case, the second pump 30 is returned to the stop state or the low-rotation state at a time point t8 after the time point t7.

In the present embodiment, if it is detected that the check valve 46 is opened at a time point t9 in the transition state in step S3, the state is immediately returned to the stop state or the low-rotation state in step S1. In this case, the second pump 30 is returned to the stop state or the low-rotation state at a time point t10 after the time point t9.

Next, with reference to FIG. 5, methods (first to third methods) of detecting that the check valve 46 is opened will be described.

In FIG. 5, in the first method, the torque Tep and the rotation number Nep of the second pump 30 are compared. If the rotation number Nep increases and the torque Tep decreases as time elapses, it is determined that the check valve 46 is opened. That is to say, in a case where the second pump 30 performs the boosting operation normally, it is impossible that the rotation number Nep increases and the torque Tep decreases at the same time.

In this case, the rotation number Nep increases and the torque Tep decreases at the same time at a time point t11, and a determination process (detection process) as to whether the check valve 46 is opened is started at a time point t12. At a time point t15 after a predetermined time has passed from the time point t12, the determination result expressing that the check valve 46 is opened is established (it is detected that the check valve 46 is opened).

In the second method, if the torque Tep is lower than the predetermined threshold Tepth, it is determined that the check valve 46 is opened. That is to say, in the case where the second pump 30 performs the boosting operation normally, it is impossible that the torque Tep decreases to be lower than the threshold Tepth in accordance with the upper limit value of the idling torque.

Even in this case, the decrease in torque Tep occurs at the time point t11, and the determination process (detection process) as to whether the check valve 46 is opened is started at the time point t12. If the torque Tep decreases to the threshold Tepth at the time point t15, the determination result expressing that the check valve 46 is opened is established (it is detected that the check valve 46 is opened).

In the third method, if the output pressure P1 becomes approximately the same as the estimation value PHe of the line pressure PH or the line pressure PH detected by the line pressure sensor 48, it is determined that the check valve 46 is opened. That is to say, in the case where the second pump 30 performs the boosting operation normally, it is impossible that the output pressure P1 increases to the estimation value PHe or the line pressure PH.

In this case, the determination process (detection process) as to whether the check valve 46 is opened is started at the time point t12 and the output pressure P1 starts to increase from the time point t13. After that, if the output pressure P1 reaches the estimation value PHe or the line pressure PH at the time point t14 and the output pressure P1 is approximately the same as the estimation value PHe or the line pressure PH at the time point t15 after a predetermined period from the time point t14, the determination result expressing that the check valve 46 is opened is established (it is detected that the check valve 46 is opened).

<2. 4 Hydraulic Control Process in Control Unit 28>

Next, with reference to a flowchart in FIG. 6, a case in which the principle illustrated in FIG. 3 to FIG. 5 is performed specifically in the control unit 28 will be described.

Figure 6:
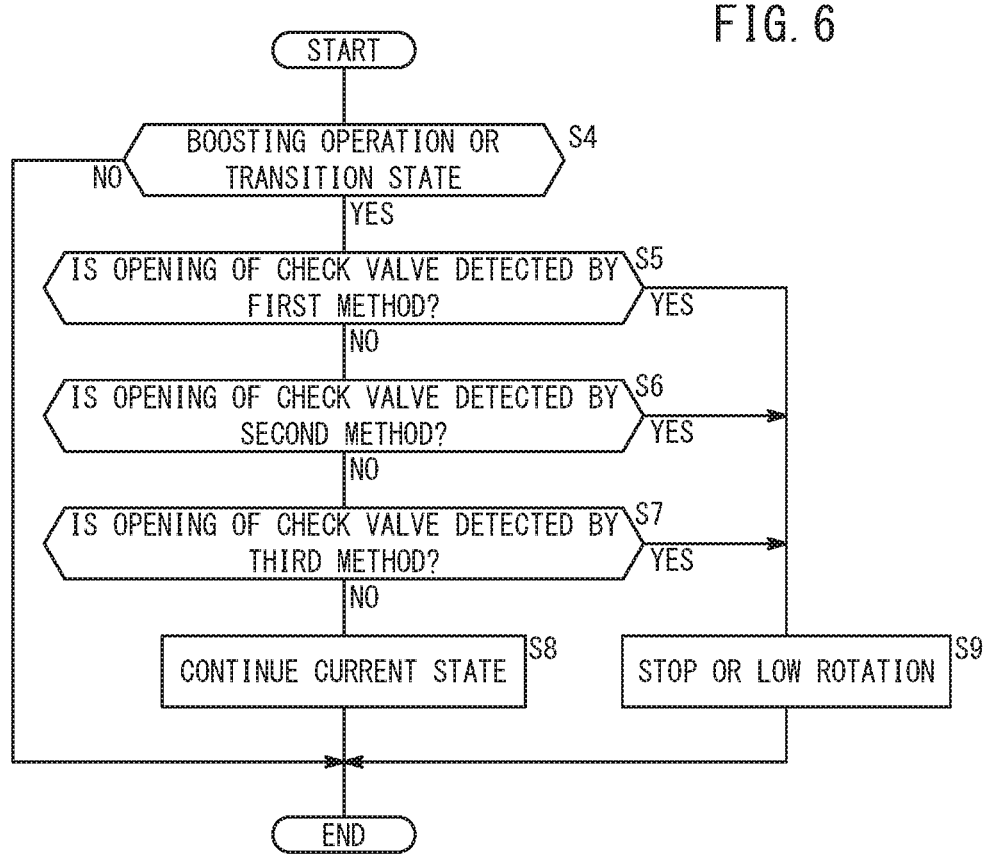
FIG. 6 is a flowchart for describing an operation in a control unit illustrated in FIG. 1.

In step S4 in FIG. 6, on the basis of the detection results of the above sensors (for example, the rotation number Nep), the state determination unit 28a of the control unit 28 determines whether the second pump 30 preforms the boosting operation or the second pump 30 is in the transition state.

If the determination result is negative in step S4 (step S4: NO), that is, if the state determination unit 28a has determined that the second pump 30 is in the stop state or the low-rotation state, the control unit 28 (the controller 28c thereof) maintains the second pump 30 in the stop state or the low-rotation state on the basis of this determination result.

On the other hand, if the determination result is positive in step S4 (step S4: YES), the process advances to step S5. In steps S5 to S7, the valve-opening detection unit 28b sequentially performs the first to third methods and determines whether the check valve 46 is open.

In this case, if all the determination results are negative in steps S5 to S7 (steps S5 to S7: NO), the valve-opening detection unit 28b determines that the check valve 46 is not opened and the process advances to step S8. In step S8, since the check valve 46 is not opened, the control unit 28 (the controller 28c thereof) determines that the hunting does not occur in the check valve 46 and continues the current state of the second pump 30 (boosting operation, or transition state).

On the other hand, if the determination result is positive in any one of steps S5 to S7 (steps S5, S6, or S7: YES), the valve-opening detection unit 28b determines that the check valve 46 is opened (it is established that the check valve 46 is opened) and the process advances to step S9. In step S9, since the check valve 46 is opened, the control unit 28 (the controller 28c thereof) determines that the hunting may occur in the check valve 46 and immediately shifts the second pump 30 to the stop state or the transition state.

Note that in FIG. 6, the valve-opening detection unit 28b of the control unit 28 may perform the determination processes in steps S5 to S7 in order and in accordance with the determination by majority, shift the process to step S8 if there are more negative determination results, and to step S9 if there are more positive determination results. Alternatively, the valve-opening detection unit 28b may perform two determination processes of steps S5 to S7 at the same time, and may shift the process to step S9 if both determination results are positive or either one is the positive determination result. Alternatively, the valve-opening detection unit 28b may perform only one determination process to determine whether the check valve 46 is opened.

3. Effect of the Present Embodiment

As described above, in the hydraulic control device 10 according to the present embodiment, when it is detected that the check valve 46 is opened, the second pump 30 is immediately stopped or shifted to the low-rotation state (idling state). As a result, in the middle of boosting of the second pump 30 or in the transition state to shift the second pump 30 from the driving state to the stop state or the low-rotation state, the hunting of the check valve 46 can be prevented.

In addition, since the valve-opening detection unit 28b of the control unit 28 detects that the check valve 46 is opened on the basis of the change in torque Tep and/or the change in rotation number Nep of the second pump 30, it is possible to efficiently detect that the check valve 46 is opened.

Specifically, in the case where the rotation number Nep increases and the torque Tep decreases like in the first method (step S5), and/or in the case where the torque Tep becomes lower than the predetermined threshold Tepth like in the second method (step S6), the valve-opening detection unit 28b determines that the check valve 46 is opened. Thus, by detecting the improbable operation of the second pump 30, it is possible to easily and quickly determine that the check valve 46 is opened.

In addition, since the valve-opening detection unit 28b detects that the check valve 46 is opened on the basis of the change in output pressure P1 detected by the output pressure sensor 26 like in the third method (step S7), it is possible to efficiently detect that the check valve 46 is opened.

Specifically, in the third method (step S7), when the output pressure P1 is approximately the same as the estimation value PHe of the line pressure PH (pressure value of the oil supplied to the continuously variable transmission mechanism 44) or the line pressure PH detected by the line pressure sensor 48, the valve-opening detection unit 28b determines that the check valve 46 is opened. Thus, by detecting the improbable operation of the second pump 30, it is possible to easily and quickly determine that the check valve 46 is opened.

The second pump 30 is the electric pump that is driven by the motor 32. By controlling the motor 32 through the driver 34 on the basis of the detection result of the valve-opening detection unit 28b, the controller 28c stops the second pump 30 or decreases the rotation number Nep of the second pump 30. Thus, the second pump 30 can be controlled efficiently through the driver 34 and the motor 32.

The present invention is not limited to the above embodiment and may employ various structures on the basis of the description in the present specification.

What is claimed is:

1. A hydraulic control device including, between a first pump and a hydraulic operation unit of a transmission, a second pump and a check valve connected in parallel, wherein first oil supplied from the first pump is supplied to the hydraulic operation unit either through the check valve or through the second pump, wherein the first oil from the first pump is supplied to the hydraulic operation unit through the check valve as the first oil, or the first oil from the first pump is pressurized by the second pump into second oil that is supplied to the hydraulic operation unit as the second oil, the hydraulic control device comprising:

a valve-opening detection unit configured to detect that the check valve is opened while the second pump is driven; and a pump controller configured to stop the second pump or decrease a rotation speed of the second pump, based on the valve-opening detection unit detecting that the check valve is opened.

2. The hydraulic control device according to claim 1, wherein the valve-opening detection unit is configured to detect that the check valve is opened based on an increase of the rotation speed and a decrease of torque of the second pump.

3. The hydraulic control device according to claim 1, wherein the valve-opening detection unit is configured to detect that the check valve is opened based on a torque of the second pump being lower that a predetermined threshold value.

4. The hydraulic control device according to claim 1, further comprising a hydraulic sensor configured to detect a first pressure value of the first oil that is supplied from the first pump to the second pump, wherein the valve-opening detection unit is configured to detect that the check valve is opened based on at least two conditions being met, wherein the at least two conditions comprise at least two of a first condition, a second condition, and a third condition, the first condition being an increase of the rotation speed and a decrease of torque of the second pump;

the second condition being torque lowering a predetermined threshold value; and the third condition being the first pressure value of the first oil being approximately the same as an estimation value of a second pressure value of the second oil that is supplied to the hydraulic operation unit or a third pressure value of oil that is detected by another hydraulic sensor.

5. The hydraulic control device according to claim 1, further comprising a hydraulic sensor configured to detect a first pressure value of the first oil that is supplied from the first pump to the second pump, wherein the valve-opening detection unit is configured to detect that the check valve is opened when the first pressure value of the first oil is approximately the same as an estimation value of a second pressure value of oil that is supplied to the hydraulic operation unit or a third pressure value of a third oil that is detected by another hydraulic sensor.

6. The hydraulic control device according to claim 1, wherein:

the second pump is an electric pump that is driven by a motor; and the pump controller is configured to stop the second pump or decrease the rotation speed of the second pump by controlling the motor on the basis of the detection result of the valve-opening detection unit.

\* \* \* \* \*